United States Patent Office 3,000,054
Patented Sept. 19, 1961

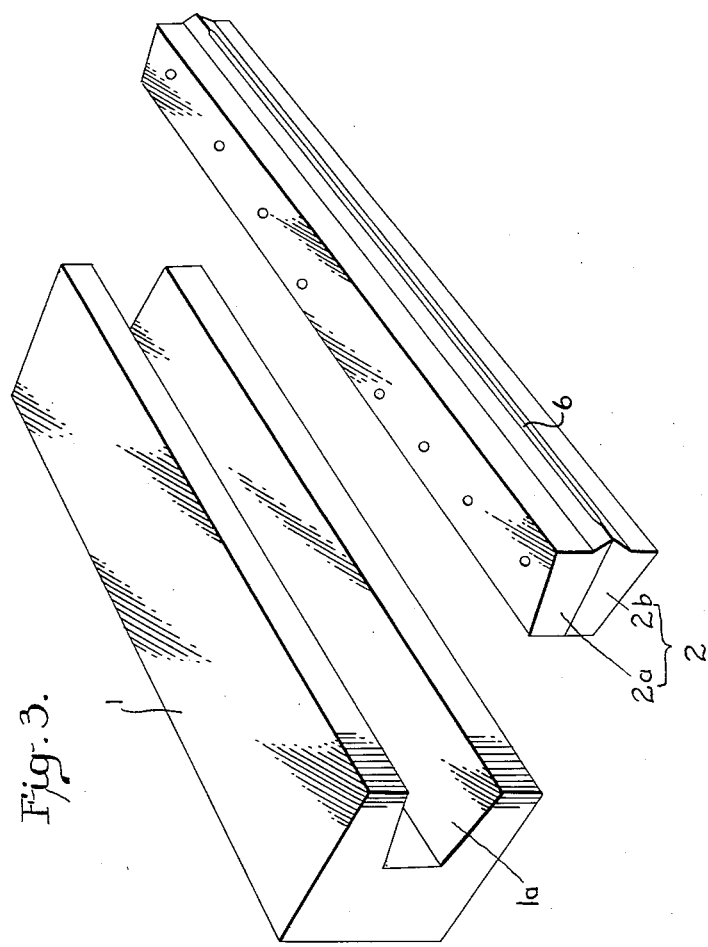

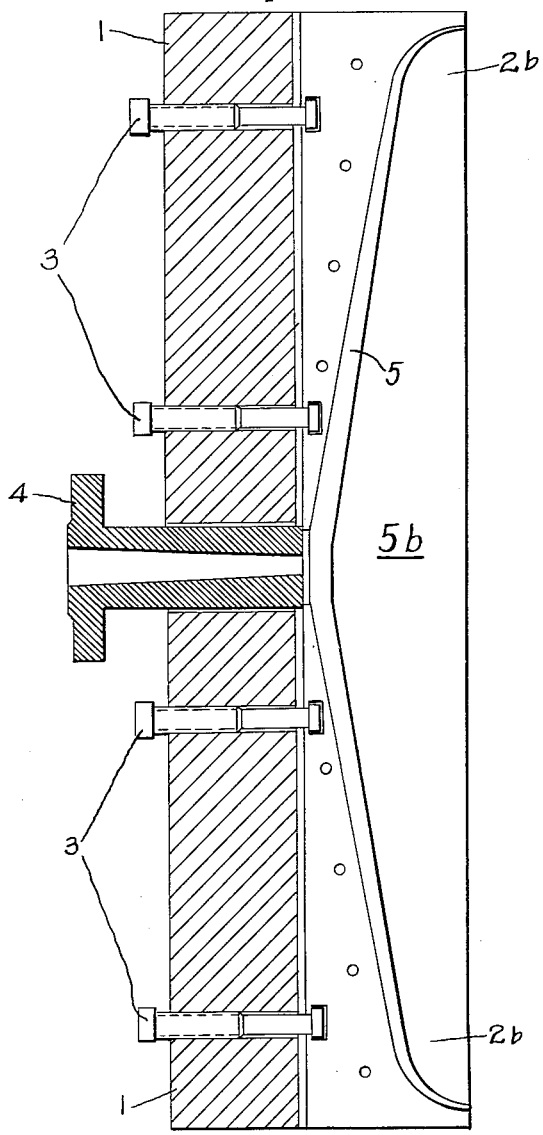

3,000,054
EXTRUSION DIE DEVICE

Walter Seifried and Wilhelm Ott, Wiesbaden-Biebrich, Germany, assignors to Kalle Aktiengesellschaft, Wiesbaden-Biebrich, Germany, a corporation of Germany
Filed June 24, 1959, Ser. No. 822,568
Claims priority, application Germany June 27, 1958
1 Claim. (Cl. 18—12)

The present invention is concerned with an extrusion device for transforming thermoplastic material into flat-shaped bodies, such as films, plates or sheets. More particularly, the invention is concerned with a device having a two-plate die mounted therein.

In the continuous processing of thermoplastic substances from the melt to flat-shaped bodies, such as films, plates or sheets, dies are generally used which have a straight orifice, such as the "two-plate dies." In the known two-plate dies the two halves of the die are joined by screws and are shaped to build channels for the flowing plastic material. By selecting channels of a suitable shape it is possible to obtain before the orifice, when a molten thermoplastic material is extruded therethrough, a zone in which a uniform pressure is maintained over the whole width of the die. The high material pressures encountered in such processes usually cause an enlargement of the orifice because the screws cannot withstand such forces without undergoing deformation.

Flat-shaped bodies free from tension can be obtained by means of two-plate dies only if—

(1) A uniform pressure is maintained over the whole width of the die in the thermoplastic material before the orifice;

(2) The upper and lower longer sides of the orifice are parallel to each other and do not change their shape in the course of the process;

(3) The distance between the upper and lower longer sides of the orifice, i.e. the height of the die slot, so closely resembles the shape of the finished flat-shaped body that the plastic material need not be stretched when leaving the die.

A uniform pressure before the orifice, i.e. a compensation of the loss of pressure which the highly viscous thermoplastic material undergoes when flowing from the die inlet to the outer ends of the die, may be obtained by providing suitable baffles. Thus, a uniform pressure may be obtained before the orifice for any given processing condition, i.e. any pressure before the die and any material throughput.

Without using mountings obstructing the flow of the thermoplastic material, it has not been possible hitherto with known two-plate dies to maintain the longer sides of the orifice in a position parallel during extrusion. For this reason, the position of the movable longer sides of the orifice was changed by means of adjusting screws during the passage of the thermoplastic material through the two-plate die, so that the requirement for a slot with parallel longer sides was no longer fulfilled.

One object of the present invention is to provide an extrusion device with a two-plate die mounted therein, which device enables the reliable continuous production of stress-free and uniform flat-shaped bodies of thermoplastic material.

Another object of the invention is to provide an extrusion device having a two-plate die with which a constant height of the slot orifice may be easily maintained under various processing conditions. It is another object of the invention to provide for an extrusion device which may be readily adapted to various thicknesses of the extruded body.

Further objects and advantages are seen from the following description and drawing wherein:

FIG. 3 is a perspective of the front of the device of FIG. 1, the two-plate die being removed;

FIG. 6 is a section taken along line VI—VI of the device as shown in FIG. 1.

Figure 1:
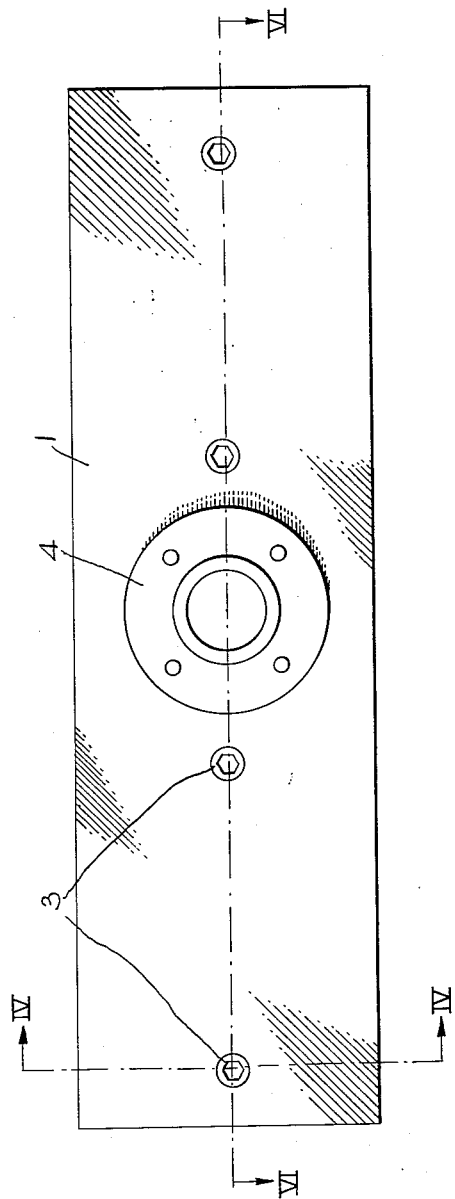
FIG. 1 is a near view of the extrusion device.
Figure 2:
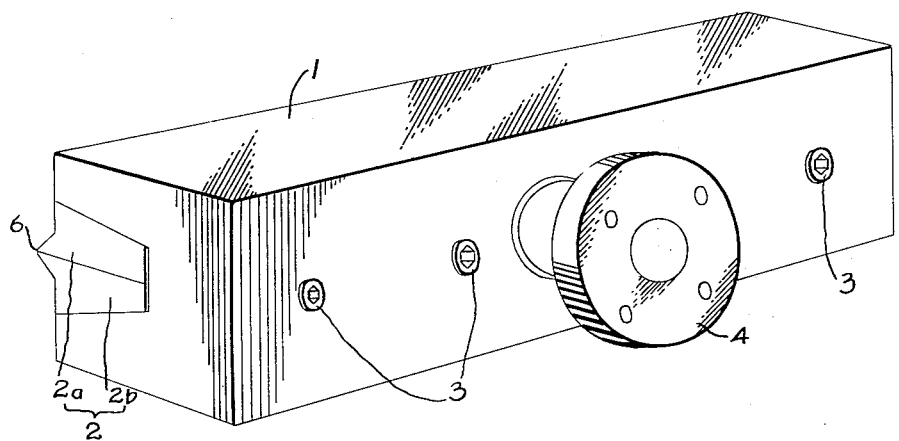
FIG. 2 is a rear view in perspective of the extrusion device.

The device of the present invention consists of a die body 1 having a tapering cut-out 1a (FIG. 3) in its front, and a two-plate die 2 which is placed into the cut-out. Moreover, the die body 1 is provided with boreholes into which are fitted pressure or tension elements 3 (FIG. 1) for adjustment of the die slot, and has an intermediate part 4 (FIG. 1) through which the molten thermoplastic materila is led from the extruder to a distribution channel 5 of the two-plate die 2 (FIG. 6).

Figure 4A:
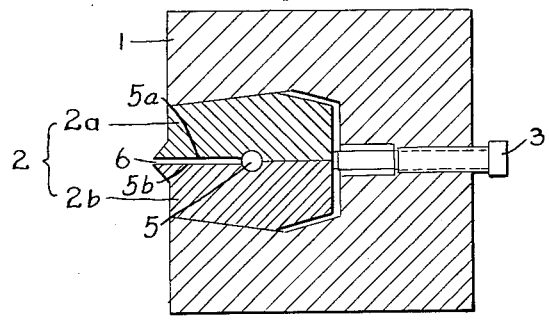
FIG. 4a is a section of an embodiment of the structure of FIG. 4.
Figure 4:
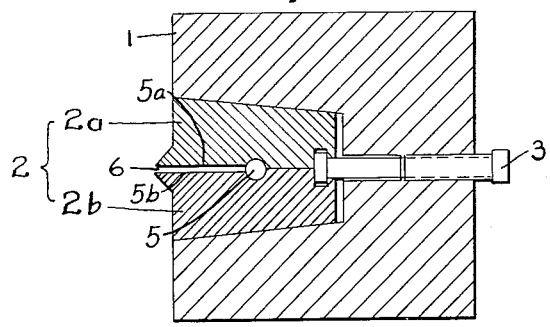
FIG. 4 is a section taken along line IV—IV of the device shown in FIG. 1.
Figure 5:
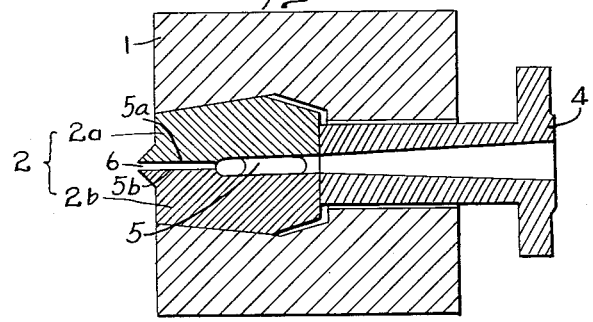
FIG. 5 is a section of still another embodiment of FIG. 4 showing, in addition, the means for connecting the device to the extruder.

The two-plate die 2 consists of the two plates 2a and 2b (FIG. 3) of which the contacting surfaces, i.e. the surfaces which, apart from the flow channels and the die slot shaped into them, lie upon each other, are parallel, while the opposed surfaces diverge. The direction of divergence may be either to or from the front of the device (see FIGS. 4 and 4a). The plates 2a and 2b are provided with flow channels 5 and baffle portions 5a and 5b (FIG. 4) and thus are enabled to provide for a uniform pressure in the thermoplastic material before said material passes the orifice under any given processing condition. By pins or screws plates 2a and 2b are combined to form die 2.

The pressure or tension elements, e.g. pressure or tension screws, which reappear at the rear end of the whole structure, bear against the back of the two-plate die 2.

When operating the device according to the present invention, the tapering two-plate die 2 is drawn or pushed towards the die body 1 by means of the tension or pressure elements 3, thus adjusting the height of the die slot 6. A change of dies can be easily effected by substituting die fitted into the cut-out 1a by another die, the substitution being performed without removing die body 1. If films of different widths are to be manufactured, dies with orifices of different widths are used, die body 1 remaining unchanged. As many two-plate dies with different orifices are required as different widths of sheets are to be produced.

Having thus described our present invention what we claim is:

Extrusion device for producing flat-shaped articles comprising a die body having a tapering cut-out, a two-plate die inserted into said tapering cut-out, the inner surfaces of which plates contact each other forming flow channels and baffles between them, the outer surfaces of said plates diverging from each other in a pattern corresponding to the tapering cut-out of the die body whereby a matching fit is formed between said tapering cut-out of the die body and said plates, said two plates also forming between them an orifice which determines the final shape of said articles, and elements extending through the die body into said tapering cut-out to adjust the position of the two-plate die within the die body, said elements for adjustment being accessible at the side of said extrusion device which is opposite the orifice, said adjustment elements acting to force the said two-plate die into the tapering cut-out.

References Cited in the file of this patent
UNITED STATES PATENTS

| | | |
|---|---|---|
| 2,514,211 | Carlson | July 4, 1950 |
| 2,897,543 | Weston et al. | Aug. 4, 1959 |